United States Patent
Kwon et al.

(10) Patent No.: US 12,537,591 B2
(45) Date of Patent: *Jan. 27, 2026

(54) REPEATER AND INTERFERENCE CANCELLATION METHOD THEREOF

(71) Applicants: SOLiD, INC., Seongnam-si (KR); FOUNDATION OF SOONGSIL UNIVERSITY-INDUSTRY COOPERATION, Seoul (KR)

(72) Inventors: Nagwon Kwon, Gyeonggi-do (KR); Hyunchae Kim, Seoul (KR); Chonghoon Kim, Seoul (KR); Seungmo Hong, Seoul (KR); Sungbin Im, Gyeonggi-do (KR)

(73) Assignees: SOLID, INC., Seongnam-si (KR); FOUNDATION OF SOONGSIL UNIVERSITY—INDUSTRY COOPERATION, Seoul (KR)

( * ) Notice: Subject to any disclaimer, the term of this patent is extended or adjusted under 35 U.S.C. 154(b) by 776 days.

This patent is subject to a terminal disclaimer.

(21) Appl. No.: 17/741,737

(22) Filed: May 11, 2022

(65) Prior Publication Data

US 2022/0271827 A1 Aug. 25, 2022

Related U.S. Application Data

(63) Continuation of application No. 16/991,564, filed on Aug. 12, 2020, now Pat. No. 11,362,730.

(30) Foreign Application Priority Data

Aug. 13, 2019 (KR) .................. 10-2019-0099116
Aug. 7, 2020 (KR) .................. 10-2020-0099506

(51) Int. Cl.
*H04B 7/155* (2006.01)

(52) U.S. Cl.
CPC ............... *H04B 7/15585* (2013.01)

(58) Field of Classification Search
None
See application file for complete search history.

(56) References Cited

U.S. PATENT DOCUMENTS 5,638,439 A * 6/1997 Kawada ............ H04B 3/23
370/290
5,758,311 A * 5/1998 Tsuji ............ G10K 11/17883
701/111

(Continued)

FOREIGN PATENT DOCUMENTS

CN 104734768 A * 6/2015
CN 104579574 B * 11/2017 ............ H04L 1/006

(Continued)

OTHER PUBLICATIONS

Communication dated Sep. 23, 2024 in Korean Application No. 10-2020-0099506.

(Continued)

*Primary Examiner* — Mohammed Rachedine
(74) *Attorney, Agent, or Firm* — Sughrue Mion, PLLC

(57) ABSTRACT

A method of operating a repeater comprises selecting some of adaptive filter coefficients among a plurality of adaptive filter coefficients of an adaptive filter used for interference cancellation, based on the size of a coefficient, generating a predicted interference signal using the selected adaptive filter coefficients and generating an interference-canceled communication signal from a received signal using the generated predicted interference signal.

15 Claims, 6 Drawing Sheets

(56) References Cited

U.S. PATENT DOCUMENTS

| | | | | |
|---|---|---|---|---|
| 9,318,147 | B1* | 4/2016 | Vikramaditya | G11B 20/10009 |
| 10,176,795 | B2* | 1/2019 | Christoph | G10K 11/17857 |
| 2017/0187448 | A1* | 6/2017 | Kwon | H04B 7/15585 |
| 2017/0195036 | A1* | 7/2017 | Kwon | H04B 7/18543 |
| 2019/0131957 | A1* | 5/2019 | Hosaka | H04B 17/3912 |
| 2019/0394339 | A1* | 12/2019 | Seo | H04R 1/1083 |
| 2021/0050909 | A1* | 2/2021 | Kwon | H04B 7/15585 |

FOREIGN PATENT DOCUMENTS

| | | | | |
|---|---|---|---|---|
| CN | 107408381 A | * | 11/2017 | H04R 1/1083 |
| CN | 107638689 A | * | 1/2018 | H04R 3/005 |
| KR | 10-2017-0077701 A | | 7/2017 | |
| WO | WO-9827719 A2 | * | 6/1998 | H04N 7/015 |
| WO | WO-2020069131 A1 | * | 4/2020 | H04B 1/0475 |

OTHER PUBLICATIONS

Notice of Allowance issued in parent U.S. Appl. No. 16/991,564 mailed Feb. 11, 2022.
Office Action issued in parent U.S. Appl. No. 16/991,564 mailed Jul. 22, 2021.
Communication issued May 27, 2025 in Korean Application No. 10-2020-0099506.

* cited by examiner

REPEATER AND INTERFERENCE CANCELLATION METHOD THEREOF

CROSS-REFERENCE TO RELATED APPLICATIONS

This application is a continuation of U.S. application Ser. No. 16/991,564 filed on Aug. 12, 2020, which claims the benefits of Korean Patent Applications No. 10-2019-0099116, filed on Aug. 13, 2019 and No. 10-2020-0099506, filed on Aug. 7, 2020, in the Korean Intellectual Property Office, the disclosures of which are incorporated herein in their entireties by reference.

BACKGROUND

1. Field

The disclosure relates to a repeater and a method of operation thereof, and more particularly, to a repeater capable of selecting and using some of adaptive filter coefficients of an adaptive filter based on the size of a coefficient and a method of operating the repeater.

The disclosure relates to results of implementation of "Development of high-power, high-efficiency, low-latency, and dual-mode (WiBro and TD-LTE) cell coverage extension device using a same frequency retransmission method using interference signal cancellation technology in TICN wireless networks (Civil-Military task number UM17408RD4)" of Institute of Civil-Military Technology Cooperation.

2. Description of the Related Art

In a repeater that receives radio frequency (RF) signals and amplifies and transmits the received RF signals, when a sufficient separation distance between a donor antenna and a service antenna is not secured, due to a feedback signal in which a portion of a transmission signal from one antenna flows into the other antenna, reception performance may deteriorate or oscillation may occur.

An interference cancellation repeater, also called an interference cancellation system (ICS) or an on-channel repeater (OCR), may cancel and transmit a feedback signal component included in a received signal by using digital signal processing technology.

SUMMARY

Provided are a repeater capable of selecting and using some of adaptive filter coefficients of an adaptive filter based on the size of a coefficient and a method of operating the repeater.

According to an aspect of an embodiment, a method of operating a repeater, the method may comprise selecting some of adaptive filter coefficients among a plurality of adaptive filter coefficients of an adaptive filter used for interference cancellation, based on the size of a coefficient, generating a predicted interference signal using the selected adaptive filter coefficients and generating an interference-canceled communication signal from a received signal using the generated predicted interference signal.

According to an aspect of an embodiment, the adaptive filter may be a finite impulse response (FIR) filter.

According to an aspect of an embodiment, the selecting of some of adaptive filter coefficients based on the size of a coefficient may comprise selecting the some of the adaptive filter coefficients based on an absolute value size of a coefficient.

According to an aspect of an embodiment, the method may further comprise sorting the plurality of adaptive filter coefficients according to an absolute value size of a coefficient, and the selecting of some of adaptive filter coefficients based on the size of a coefficient comprises, selecting some of the adaptive filter coefficients having an upper absolute value size according to a sorted order.

According to an aspect of an embodiment, the selecting of some of adaptive filter coefficients based on the size of a coefficient may comprise selecting K adaptive filter coefficients from among N of the adaptive filter coefficients, wherein N is a natural number of 2 or more, and K is a natural number less than N.

According to an aspect of an embodiment, a ratio of the N and K may be a preset value.

According to an aspect of an embodiment, a ratio of the N and K may be set flexibly.

According to an aspect of an embodiment, the method may further comprise searching for a point where an absolute value difference between adjacent coefficients is greater than a reference value when the adaptive filter coefficients are sorted in the order of absolute value size of a coefficient, and the selecting of some of adaptive filter coefficients based on the size of a coefficient comprises, selecting some of the adaptive filter coefficients having an upper absolute value size according to the order of absolute value size of a coefficient, based on the searched point.

According to an aspect of an embodiment, a ratio of the N and K may be set according to quality of service (QoS).

According to an aspect of another embodiment, a repeater may comprise a controller configured to select and output some of adaptive filter coefficients among a plurality of adaptive filter coefficients of an adaptive filter used for interference cancellation, based on the size of a coefficient, an adaptive filter configured to generate a predicted interference signal using the selected adaptive filter coefficients and a subtracter configured to generate an interference-canceled communication signal from a received signal using the generated predicted interference signal.

According to an aspect of an embodiment, the controller may be configured to sort the plurality of adaptive filter coefficients according to an absolute value size of a coefficient, and to select the some of sorted adaptive filter coefficients having an upper absolute value size according to the order of absolute value size.

According to an aspect of an embodiment, the controller is configured to select K adaptive filter coefficients from among N of the adaptive filter coefficients, wherein N is a natural number of 2 or more, and K is a natural number less than N.

According to an aspect of an embodiment, a ratio of the N and K may be set flexibly.

According to an aspect of an embodiment, the controller, when the adaptive filter coefficients are sorted in the order of absolute value size, is configured to search for a point where an absolute value difference between adjacent coefficients is greater than a reference value, and to select some of the adaptive filter coefficients having an upper absolute value size according to a sorted order based on the searched point.

According to an aspect of an embodiment, a ratio of the N and K may be set according to quality of service (QoS).

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
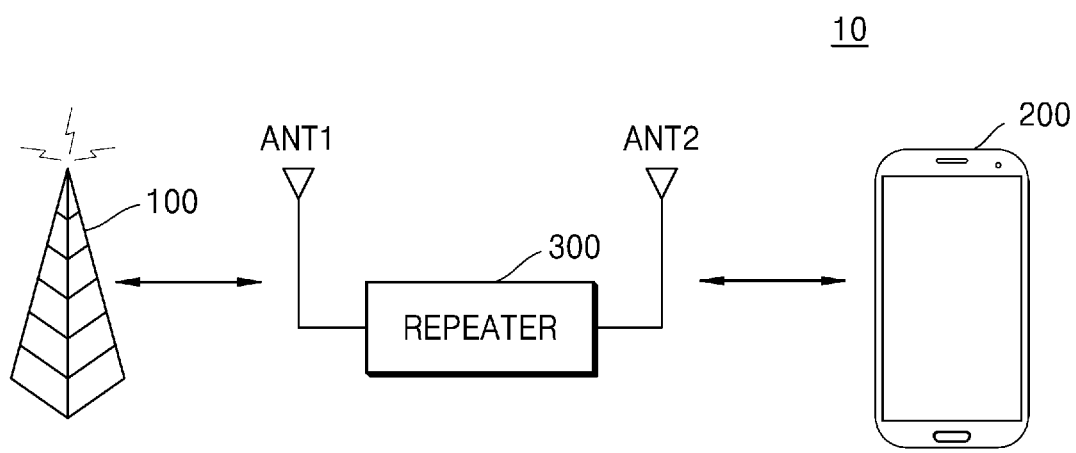
FIG. 1 is a conceptual diagram of a communication system according to an embodiment.

The inventive concept may be variously modified and have various embodiments, so that specific embodiments will be illustrated in the drawings and described in the detailed description. However, this does not limit the inventive concept to specific embodiments, and it should be understood that the inventive concept covers all the modifications, equivalents and replacements included within the idea and technical scope of the inventive concept.

In describing the inventive concept, in the following description, a detailed explanation of known related technologies may be omitted to avoid unnecessarily obscuring the subject matter of the present disclosure. In addition, numeral figures (e.g., 1, 2, and the like) used during describing the specification are just identification symbols for distinguishing one element from another element.

Further, in the specification, if it is described that one component is "connected" or "accesses" the other component, it is understood that the one component may be directly connected to or may directly access the other component but unless explicitly described to the contrary, another component may be "connected" or "access" between the components.

In addition, terms including "unit," "er," "or," "module," and the like disclosed in the specification mean a unit that processes at least one function or operation and this may be implemented by hardware or software such as a processor, a micro processor, a micro controller, a central processing unit (CPU), a graphics processing unit (GPU), an accelerated Processing unit (APU), a digital signal processor (DSP), an application specific integrated circuit (ASIC), and a field programmable gate array (FPGA) or a combination of hardware and software. Furthermore, the terms may be implemented in a form coupled to a memory that stores data necessary for processing at least one function or operation.

Moreover, it is intended to clarify that components in the specification are distinguished in terms of primary functions of the components. That is, two or more components to be described below may be provided to be combined to one component or one component may be provided to be divided into two or more components for each more subdivided function. In addition, each of the respective components to be described below may additionally perform some or all functions among functions which other components take charge of in addition to a primary function which each component takes charge of and some functions among the primary functions which the respective components take charge of are exclusively charged by other components to be performed, of course.

FIG. 1 is a conceptual diagram of a communication system 10 according to an embodiment.

Referring to FIG. 1, the communication system 10 according to an embodiment may include a base station 100, a wireless communication terminal 200, and a repeater 300.

The wireless communication terminal 200 may mean a device capable of performing wireless communication according to various mobile communication standards, and its shape may be variously modified.

The repeater 300 may relay communication between the base station 100 and the wireless communication terminal 200.

According to an embodiment, the repeater 300 may relay a communication signal in a communication network composed of a 2G mobile communication network such as a global system for mobile communication (GSM) or code division multiple access (CDMA), a 3G mobile communication network such as wideband code division multiple access (WCDMA) or CDMA2000, a 3.5G mobile communication network such as high speed downlink packet access (HSDPA) or high speed uplink packet access (HSUPA), a 4G mobile communication network such as long term evolution (LTE) or LTE-Advanced, a 5G mobile communication network (non-standalone (NSA) or standalone (SA)), a 6G mobile communication network, or a combination thereof.

The repeater 300 may receive a communication signal (e.g., a base station signal) received from the base station 100 through a first antenna ANT1 and may relay the received communication signal (e.g., the base station signal) to the wireless communication terminal 200 through a second antenna ANT2.

According to an embodiment, the communication signal may be a wireless communication signal (e.g., a radio frequency (RF) signal).

The first antenna ANT1 may be referred to as a donor antenna and the second antenna ANT2 may be referred to as a service antenna or a coverage antenna, but are not limited thereto.

According to an embodiment, the repeater 300 may be implemented as an interference cancellation system (ICS) repeater.

In FIG. 1, for convenience of description, the repeater 300 relays communication between one base station 100 and one wireless communication terminal 200, but may also relay communication between a plurality of base stations and a plurality of wireless communication terminals. According to another embodiment, the repeater 300 may relay communication between the base station 100 and another repeater (not shown).

Detailed structure and operation of the repeater 300 will be described in detail with reference to FIG. 2.

Figure 2:
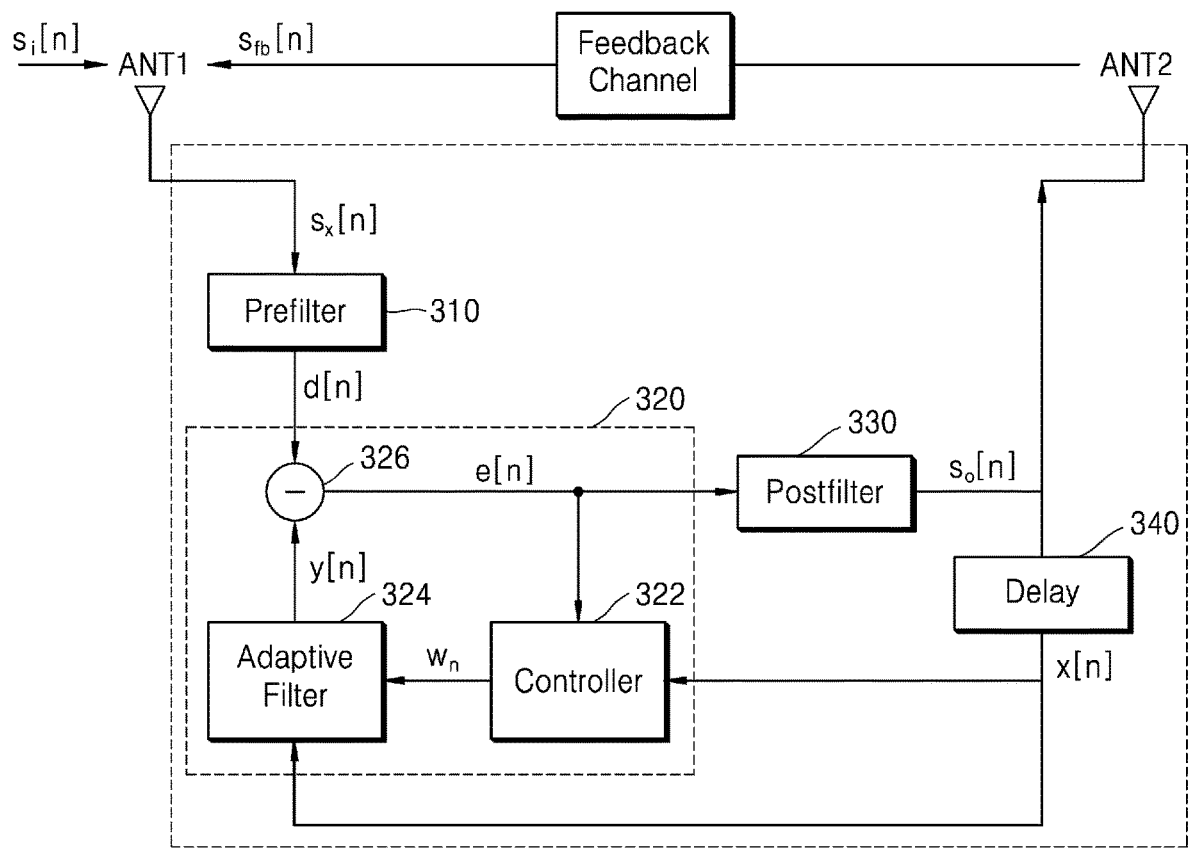
FIG. 2 is a block diagram of a repeater shown in FIG. 1, according to an embodiment.

FIG. 2 is a block diagram of the repeater 300 shown in FIG. 1, according to an embodiment.

Referring to FIGS. 1 and 2, the repeater 300 may include the first antenna ANT1, the second antenna ANT2, a prefilter 310, an interference cancellation part 320, a postfilter 330, and a delay 340.

Although FIG. 2, for convenience of explanation, mainly shows a configuration that operates in a process of relaying a wireless communication signal in one direction (e.g., downlink), the repeater 300 may further include a configuration that operates in a process of relaying the wireless communication signal in the opposite direction (e.g., uplink).

The first antenna ANT1 may receive a wireless communication signal $Si[n]$ received from the base station 100 and a feedback signal Sfb[n] (i.e., an interference signal or a feedback signal) that is output from the second antenna ANT2 and received through a feedback channel.

The repeater 300 may further include an analog-to-digital converter (ADC) that converts the received wireless communication signal and feedback signal.

In FIG. 2, an ADC process is omitted for convenience of explanation, and the first antenna ANT1 receives the digital signals Si[n] and Sfb[n] directly. However, the digital signals Si[n] and Sfb[n] may refer to signals in which an RF signal received from the base station 100 and an RF signal received from the second antenna ANT2 are digitally converted, respectively.

In the present specification, "digital signal" may broadly mean a digitized signal regardless of its shape, and may mean a concept including a complex baseband digital signal.

The wireless communication signal Si[n] and the feedback signal Sfb[n] are combined to generate a received signal Sx[n], and the generated received signal Sx[n] may be input to the prefilter 310.

The prefilter 310 may be an equivalent circuit showing characteristics and delays of all filters until the received signal Sx[n] input through the first antenna ANT1 of the repeater 300 is transmitted to a subtracter 326.

A received signal d[n] that has passed through the prefilter 310 may be input to the interference cancellation part 320.

The interference cancellation part 320 may include a controller 322, an adaptive filter 324, and the subtracter 326.

The controller 322 may generate and output adaptive filter coefficients Wn to be used in the adaptive filter 324 by using an interference-canceled communication signal e[n] and a delayed output signal x[n].

According to an embodiment, the controller 322 may generate and output optimal adaptive filter coefficients Wn for minimizing interference by using the interference canceled communication signal e[n] and the delayed output signal x[n].

According to an embodiment, the adaptive filter coefficients Wn may be formed in the form of a coefficient vector.

The controller 322 may select some of adaptive filter coefficients among a plurality of adaptive filter coefficients Wn used in the adaptive filter 324 based on the size (e.g., an absolute value size) of a coefficient, and may transmit only the selected adaptive filter coefficients to the adaptive filter 324.

According to an embodiment, the controller 322 may sort the adaptive filter coefficients according to an absolute value size of a coefficient, and may select some of the sorted adaptive filter coefficients having an upper absolute value size according to the sorted order.

For example, assuming that the number of taps of the adaptive filter 324 is N (N is a natural number of 2 or more), when adaptive filter coefficients ĥ[n] are sorted in descending order according to the absolute value size, it can be expressed as Equation 1 below.

$$\hat{h}_0 \geq \hat{h}_1 \geq \cdots \geq \hat{h}_{N-1} \qquad \text{(Equation 1)}$$

The controller 322 may divide the coefficients sorted in Equation 1 above into two sets P and R according to Equation 2 below.

$$\hat{h}[p] = \hat{h}_i \in \begin{cases} P & i < K < N \\ R & \text{otherwise} \end{cases} \qquad \text{(Equation 2)}$$

When the absolute value of the filter coefficients ĥ[n] in Equation 2 above falls within the upper K number (K is a natural number less than N), the controller 322 may include the absolute value in a P set, and otherwise in an R set.

The controller 322 may select K filter coefficients included in the P set from among a plurality of filter coefficients, and may transmit the selected filter coefficients to the adaptive filter 324.

According to an embodiment, the ratio of N and K may be a preset value.

According to another embodiment, the ratio of N and K may be set flexibly.

According to another embodiment, when the adaptive filter coefficients are sorted in the order of absolute value size as shown in Equation 1, the controller 322 may search for a point where an absolute value difference between adjacent coefficients is greater than a reference value, and may select some adaptive filter coefficients based on the searched point.

For example, when there are a total of 5 adaptive filter coefficients (N=5) and an absolute value difference between adaptive filter coefficients ĥ$_1$ and ĥ$_2$ and an absolute value difference between adaptive filter coefficients ĥ$_2$ and ĥ$_3$ are less than the reference value, but an absolute value difference between the adaptive filter coefficients ĥ$_3$ and ĥ$_4$ is greater than or equal to the reference value, the controller 322 may search for a point between the adaptive filter coefficients ĥ$_3$ and ĥ$_4$, may select hi, ĥ$_2$, and ĥ$_3$ having an upper absolute value size in the order of absolute value size of a coefficient based on the searched point by dividing hi, ĥ$_2$, and ĥ$_3$ into the P set, and may divide ĥ$_4$ and ĥ$_5$ into the R set and exclude ĥ$_4$ and ĥ$_5$ from selection. According to an embodiment, the reference value may be set based on an average value of an absolute value difference between adjacent coefficients of all adaptive filter coefficients.

According to another embodiment, the ratio of N and K may be set according to quality of service (QoS).

For example, when the standard of interference cancellation performance allowed by QoS is relatively high, the ratio of K to N (K/N) may be set relatively high, and when the standard of interference cancellation performance allowed by QoS is relatively low, the ratio of K to N (K/N) may be set relatively low.

For example, when the standard of signal delay allowed in QoS is relatively high, the ratio of K to N (K/N) may be set relatively low, and when the standard of signal delay allowed by QoS is relatively low, the ratio of K to N (K/N) may be set relatively high.

For example, the ratio of N and K may be set considering the standard of interference cancellation performance allowed in QoS and the standard of allowed signal delay.

The adaptive filter 324 may generate a predicted interference signal y[n] by using the adaptive filter coefficients Wn selected and transmitted by the controller 322 and the delayed output signal x[n].

According to an embodiment, the adaptive filter 324 may be implemented as a digital filter or an analog filter using an adaptive algorithm.

According to an embodiment, the adaptive filter may be implemented as a finite impulse response (FIR) filter.

The subtracter 326 may subtract the predicted interference signal y[n] output from an adaptive filter 360 from the received signal d[n] passed through the prefilter 310, and may output the interference-canceled communication signal e[n].

According to an embodiment, the controller 322, the adaptive filter 324, and the subtracter 326 may be implemented with one processor(eg. the interference cancellation part 320). For example, the processor 320 may be implemented as a processor in the form of application specific integrated circuits (ASIC) or a field programmable gate array (FPGA).

The postfilter 330 may refer to an equivalent circuit showing characteristics and delays of all filters until a communication signal output after the subtracter 326 is transmitted to the second antenna ANT2.

An output signal So[n] output from the postfilter 330 may be transmitted to the wireless communication terminal 200 through the second antenna ANT2.

The output signal So[n] output from the postfilter 330 may be delayed through the delay 340 and output as the delayed output signal x[n]. The delayed output signal x[n] output from the delay 340 may be input to the controller 322 and the adaptive filter 324.

Figure 3:
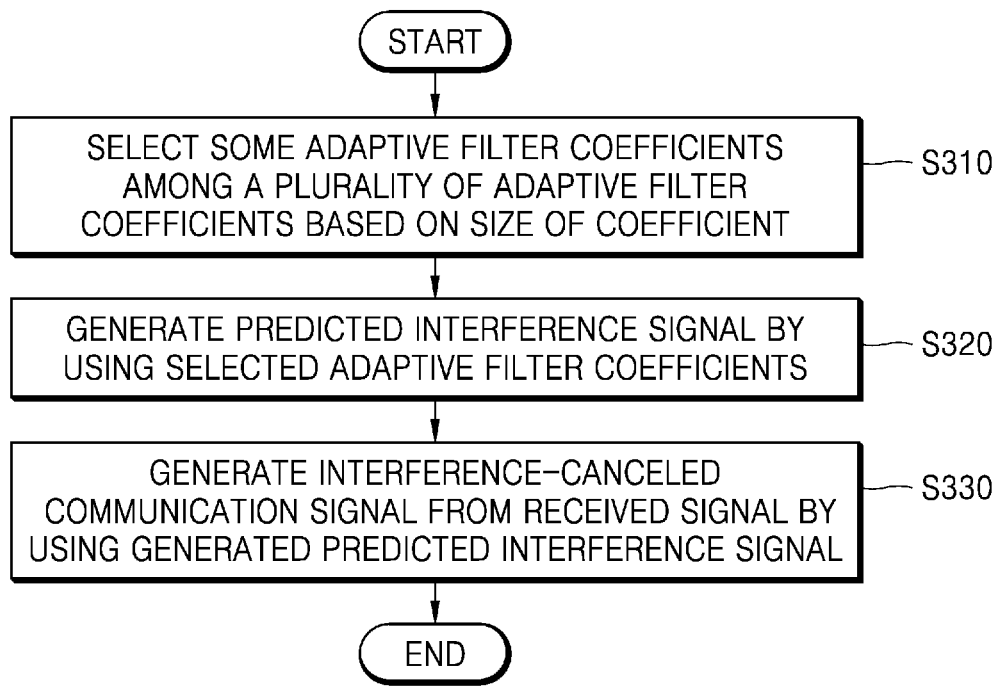
FIG. 3 is a flowchart of a method of operating a repeater according to an embodiment.

FIG. 3 is a flowchart of a method of operating the repeater 300 according to an embodiment.

Referring to FIGS. 1 to 3, in operation S310, the repeater 300 may select some of adaptive filter coefficients of the adaptive filter 324 based on the size of a coefficient (e.g., an absolute value size).

According to an embodiment, the repeater 300 may select some of the adaptive filter coefficients according to a preset ratio.

According to another embodiment, the repeater 300 may select some of the adaptive filter coefficients according to a flexibly set ratio.

According to another embodiment, when the adaptive filter coefficients are sorted in the order of absolute value size, the repeater 300 may search for a point where an absolute value difference between adjacent coefficients is greater than a reference value, and may select some adaptive filter coefficients based on the searched point.

According to another embodiment, the repeater 300 may select some of the adaptive filter coefficients among a plurality of adaptive filter coefficients according to a ratio set based on QoS.

In operation S320, the repeater 300 may generate a predicted interference signal using the adaptive filter coefficients selected in operation S310.

According to an embodiment, the adaptive filter 324 included in the repeater 300 may generate a predicted interference signal by using only the adaptive filter coefficients selected in operation S310 instead of using all of the adaptive filter coefficients.

In operation S330, the repeater 300 may generate an interference-canceled communication signal from a received signal by using the predicted interference signal generated in operation S320.

According to an embodiment, the subtracter 326 included in the repeater 300 may generate the interference-canceled communication signal e[n] by subtracting the predicted interference signal y[n] from the received signal d[n] that has passed through the prefilter 310.

Figure 4:
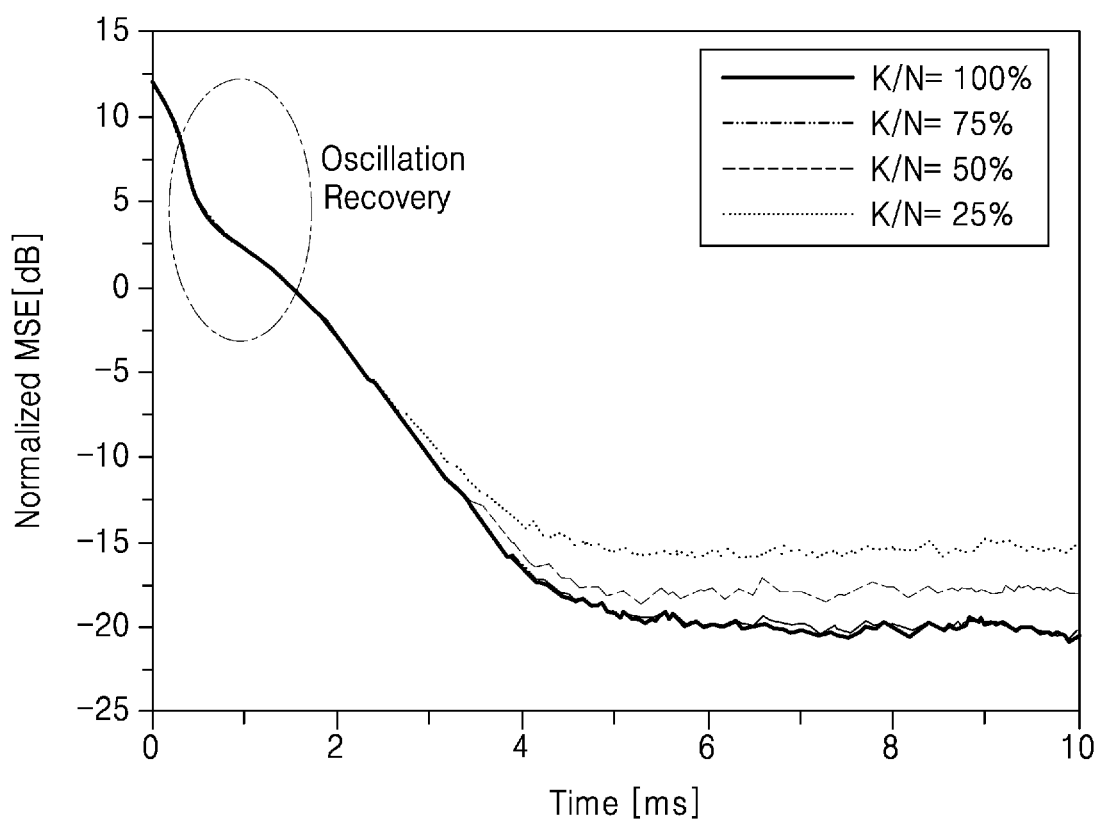
FIG. 4 is a graph of a transient response characteristic according to a selection ratio of an adaptive filter coefficient.

FIG. 4 is a graph of a transient response characteristic according to a selection ratio of an adaptive filter coefficient.

Referring to FIG. 4, the graph of FIG. 4 shows a process from an initial state of the repeater 300 to a normal operation state when the feedback signal Sfb[n] is 10 dB greater than the wireless communication signal Si[n].

The graph of FIG. 4 shows a form in which an NMSE decreases while returning from oscillation occurring in the initial state. In particular, it can be seen that when K/N is 75%, performance degradation hardly occurs due to the transient response characteristic compared to when K/N is 100%.

In addition, even when K/N is 50% or 25%, although there is some deterioration in performance due to the transient response characteristic, it can be confirmed that it is the level of a K/N ratio that can be set if the range is acceptable in a communication system.

Figure 5:
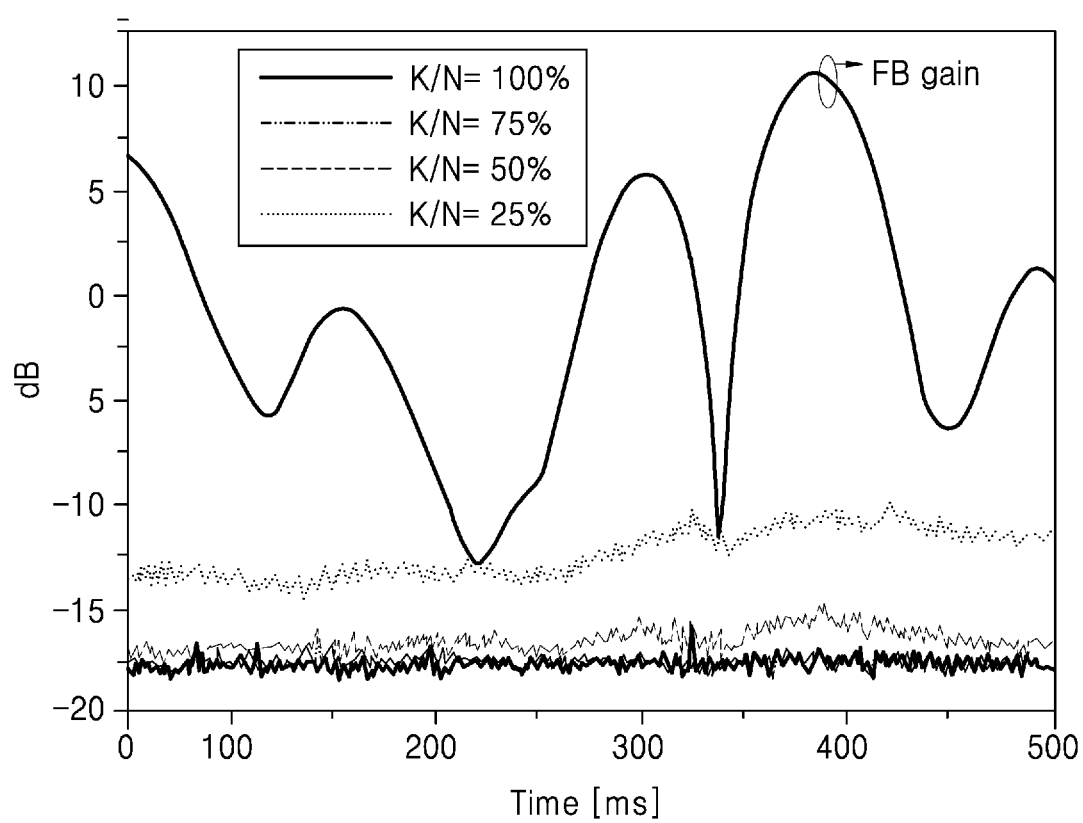
FIG. 5 is a graph of a fading feedback response characteristic according to a selection ratio of an adaptive filter coefficient.

FIG. 5 is a graph of a fading feedback response characteristic according to a selection ratio of an adaptive filter coefficient.

Referring to FIG. 5, the graph of FIG. 5 shows response characteristics to a fading feedback signal.

In the graph of FIG. 5, the solid line denotes a change in a feedback gain due to fading, and it is assumed that a step size (p) in a normalized least mean square (NLMS) algorithm is set to 0.01.

In a section where the feedback gain (FB gain) is less than 5 dB, it can be seen that stable interference cancellation is achieved even when K/N is 50%.

In addition, even when K/N is 25%, although there is some deterioration in performance due to a feedback gain characteristic due to fading, it can be confirmed that it is the level of a K/N ratio that can be set if the range is acceptable in a communication system.

Figure 6:
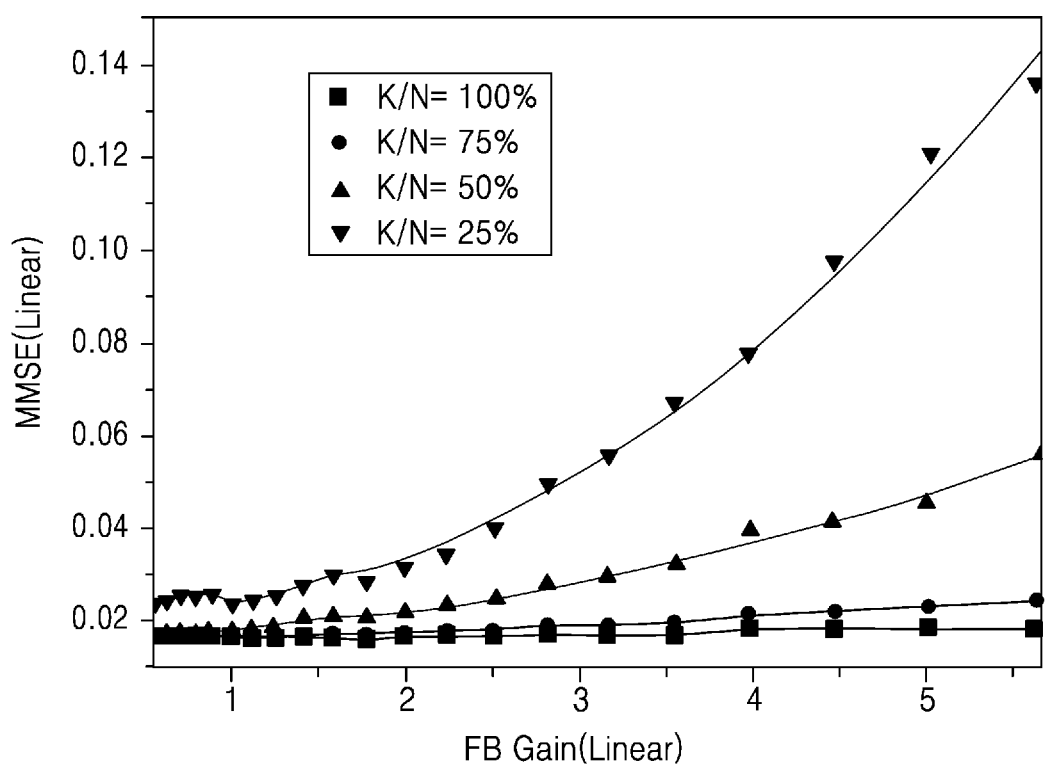
FIG. 6 is a graph showing a relationship between a feedback gain and a normalized mean square error (NMSE) according to a selection ratio of an adaptive filter coefficient.

FIG. 6 is a graph showing a relationship between a feedback gain and an NMSE according to a selection ratio of an adaptive filter coefficient.

Referring to FIG. 6, the graph of FIG. 6 shows the relationship between the feedback gain (FB Gain) and the NMSE when there is one feedback path.

The NMSE may be represented by the following Equation 3.

$$NMSE_e = |A|^2 \sum_{p \in R} |h_i[p]|^2 + \alpha \mu N \quad \text{(Equation 3)}$$

In Equation 3, A is the amplitude of a feedback signal, R is a set of unselected adaptive filter coefficients, a is a proportionality constant according to the type of adaptive algorithm, p is a convergence constant, and N is the number of taps of an adaptive filter.

It can be seen that the NMSE is proportional to the sum of squares of unselected adaptive filter coefficients according to Equation 3 above, which can also be confirmed by the graph of FIG. 6.

When K/N is set to 75%, it can be confirmed that there is almost no deterioration of an NMSE characteristic as a whole compared to the case where K/N is 100%. When the feedback gain (FB Gain) is less than 2 dB, it can be confirmed that deterioration of an NMSE characteristic is not significant even if K/N is set up to 25%.

According to the method and apparatus according to an embodiment, by selecting and using some of adaptive filter coefficients of an adaptive filter based on the size of a coefficient, it is possible to minimize the amount of computation in the adaptive filter without significantly deteriorating interference cancellation performance.

Further, according to the method and apparatus according to an embodiment, the method according to the embodiment may be applied while using an adaptive algorithm used in the existing adaptive filter as it is.

While the disclosure has been particularly shown and described with reference to embodiments thereof, it will be understood that various changes in form and details may be made therein without departing from the scope of the following claims.

What is claimed is:

1. A method of operating a repeater, the method comprising:
   generating a plurality of adaptive filter coefficients of an adaptive filter based on a received signal;
   selecting, from the generated plurality of adaptive filter coefficients, some of adaptive filter coefficients for interference cancellation, based on a size of a coefficient;
   generating a predicted interference signal using the selected adaptive filter coefficients; and
   generating an interference-canceled communication signal from a received signal using the generated predicted interference signal.

2. The method of claim 1, wherein the adaptive filter is a finite impulse response (FIR) filter.

3. The method of claim 1, wherein the selecting of some of adaptive filter coefficients based on the size of the coefficient comprises:
   selecting the some of the adaptive filter coefficients based on an absolute value size of a coefficient.

4. The method of claim 1, further comprising:
   sorting the plurality of adaptive filter coefficients according to an absolute value size of a coefficient, and
   wherein the selecting of some of adaptive filter coefficients based on the size of the coefficient comprises:
   selecting some of the adaptive filter coefficients having an upper absolute value size according to a sorted order.

5. The method of claim 4, the selecting of some of adaptive filter coefficients based on the size of the coefficient comprises:
   selecting K adaptive filter coefficients from among N of the adaptive filter coefficients, wherein N is a natural number of 2 or more, and K is a natural number less than N.

6. The method of claim 5, wherein a ratio of the N and the K is a preset value.

7. The method of claim 5, wherein a ratio of the N and the K is set flexibly.

8. The method of claim 7, further comprising:
   searching for a point where an absolute value difference between adjacent coefficients is greater than a reference value when the adaptive filter coefficients are sorted in an order of absolute value size of a coefficient, and
   wherein the selecting of some of adaptive filter coefficients based on the size of the coefficient comprises:
   selecting some of the adaptive filter coefficients having an upper absolute value size according to the order of absolute value size of a coefficient, based on the searched point.

9. The method of claim 5, wherein a ratio of the N and K is set according to quality of service (QOS).

10. A repeater comprising:
    a controller configured to:
    generate a plurality of adaptive filter coefficients of an adaptive filter based on a received signal; and
    select, from the generated plurality of adaptive filter coefficients, some of adaptive filter coefficients for interference cancellation, based on a size of a coefficient, and output the selected adaptive filter coefficients;
    the adaptive filter configured to generate a predicted interference signal using the selected adaptive filter coefficients; and
    a subtracter configured to generate an interference-canceled communication signal from a received signal using the generated predicted interference signal.

11. The repeater of claim 10, wherein the controller is configured to sort the plurality of adaptive filter coefficients according to an absolute value size of a coefficient, and to select some of the sorted plurality of adaptive filter coefficients having an upper absolute value size according to an order of absolute value size.

12. The repeater of claim 11, wherein the controller is configured to select K adaptive filter coefficients from among N of the adaptive filter coefficients,
    wherein N is a natural number of 2 or more, and K is a natural number less than N.

13. The repeater of claim 12, wherein a ratio of the N and the K is set flexibly.

14. The repeater of claim 13, wherein the controller, when the adaptive filter coefficients are sorted in the order of absolute value size, is configured to search for a point where an absolute value difference between adjacent coefficients is greater than a reference value, and to select some of the adaptive filter coefficients having an upper absolute value size according to a sorted order based on the searched point.

15. The repeater of claim 12, wherein a ratio of the N and the K is set according to quality of service (QOS).

* * * * *